United States Patent
Schoonover et al.

(10) Patent No.: US 8,192,827 B2
(45) Date of Patent: Jun. 5, 2012

(54) REINFORCED EXTRUSION AND METHOD FOR MAKING SAME

(75) Inventors: James Schoonover, Shelby Township, MI (US); Vince McNish, Fostoria, MI (US)

(73) Assignee: Vintech Industries, Imlay City, MI (US)

( * ) Notice: Subject to any disclaimer, the term of this patent is extended or adjusted under 35 U.S.C. 154(b) by 322 days.

(21) Appl. No.: 12/589,225

(22) Filed: Oct. 20, 2009

(65) Prior Publication Data
US 2010/0117257 A1    May 13, 2010

Related U.S. Application Data

(60) Provisional application No. 61/196,654, filed on Oct. 20, 2008.

(51) Int. Cl.
*B32B 3/08*    (2006.01)

(52) U.S. Cl. .................. 428/122; 428/213; 428/217

(58) Field of Classification Search .................. 428/122, 428/217, 213; 49/475.1, 490.1, 498.1
See application file for complete search history.

(56) References Cited

U.S. PATENT DOCUMENTS

| | | | | |
|---|---|---|---|---|
| 4,937,126 A | * | 6/1990 | Jackson | 428/122 |
| 5,437,124 A | * | 8/1995 | Ahlfeld et al. | 49/479.1 |
| 2004/0108045 A1 | * | 6/2004 | Hauser | 156/181 |

* cited by examiner

*Primary Examiner* — Alexander Thomas
(74) *Attorney, Agent, or Firm* — Warn Partners, P.C

(57) ABSTRACT

A reinforced extrusion for attachment to a motor vehicle component edge or flange. The reinforced extrusion includes a reinforcement core having at least one flexible wire and at least one threaded cord. A thermoplastic overmold is formed on at least one side of the reinforcement core and at least partly fills any gaps formed in the reinforcement core. An extruded layer is selectively formed around the thermoplastic overmold and reinforcement core and has a flange extending flange portion extending from a channel portion for engaging a motor vehicle component. The thermoplastic overmold helps prevent the reinforcement core from showing through to any visible show surface of the reinforced extrusion.

13 Claims, 3 Drawing Sheets

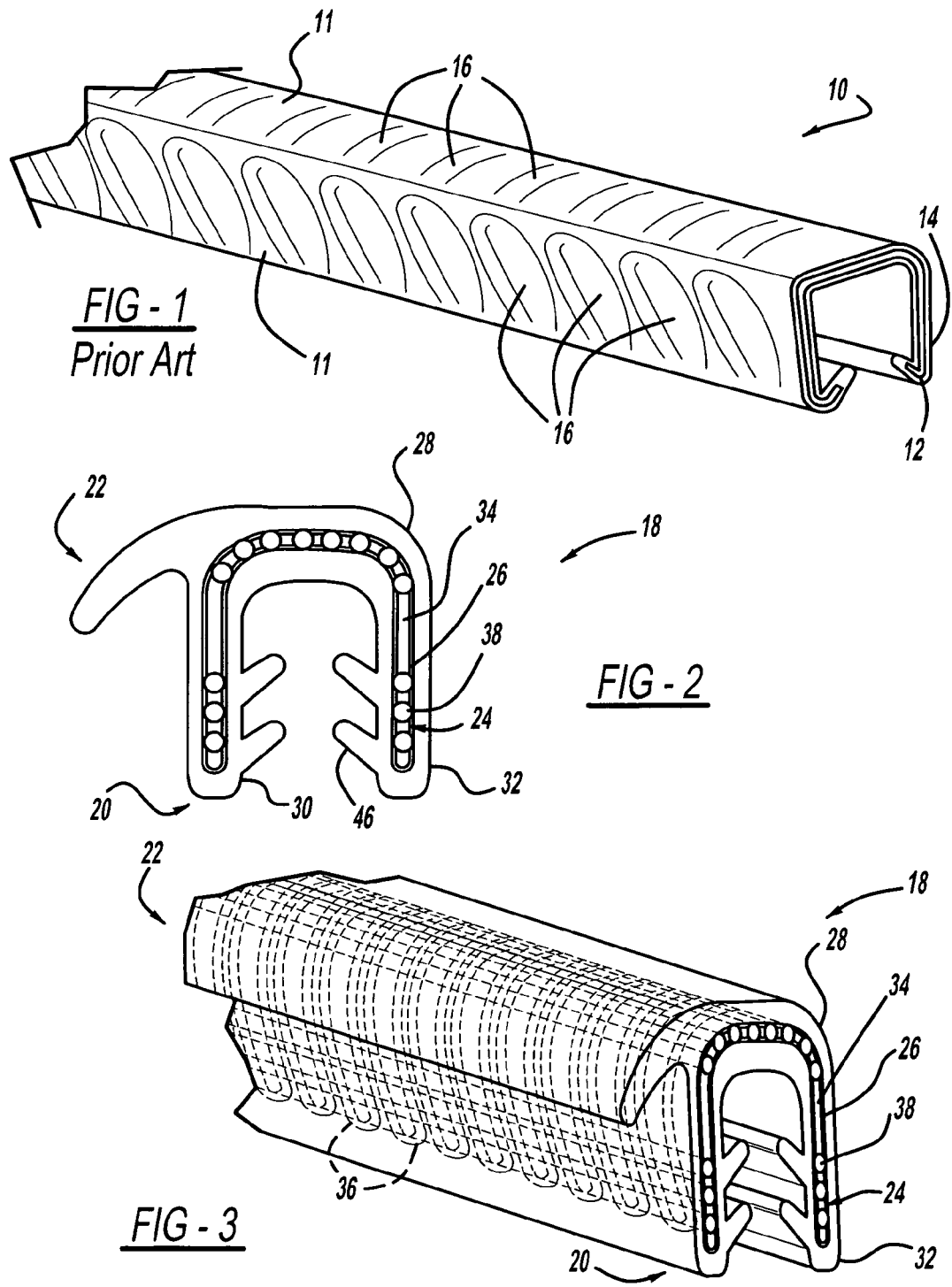

REINFORCED EXTRUSION AND METHOD FOR MAKING SAME

CROSS-REFERENCE TO RELATED APPLICATIONS

This application claims the benefit of U.S. Provisional Patent Application No. 61/196,654, filed Oct. 20, 2008, the contents of which are incorporated by reference in their entirety.

FIELD OF THE INVENTION

The present invention relates to a reinforced extrusion, more specifically, to a reinforced extrusion for attachment to a motor vehicle and a method for making same.

BACKGROUND OF THE INVENTION

Extrusion trims are generally known and are commonly used for vehicle window, trunk, and door sealing and trimming. Typical extrusion trims have a hollow cavity for attachment to a flange on a vehicle and at least a portion of the extrusion trim is visible when installed into the vehicle. Typically, the extrusion trim comprises a pre-formed metal core or stamped metal plate configured to form the hollow cavity an elastomeric material extruded about the pre-formed metal core. The pre-formed metal core comprises metal members and slots or apertures therebetween. When the elastomeric material is extruded about the metal core, the elastomeric material sinks into the slots and apertures causing an aesthetically displeasing series of ridges and valleys along the outer surfaces of the extrusion trim. This is commonly known as the "hungry horse" effect or appearance. In such known extrusion trims, the undesirable hungry horse appearance becomes even more pronounced when the extrusion trims are bent and manipulated into the installed position in the vehicle. Another common problem with known extrusion trims is that the pre-formed metal cores can require larger amounts of metal which can be an added expense.

Accordingly, there exists a need for an improved reinforced extrusion and method of making the same that helps to inhibit the hungry horse effect which overcomes the aforementioned problems.

SUMMARY OF THE INVENTION

The present invention is directed to a reinforced extrusion for attaching to a motor vehicle component edge or flange for helping to seal and trim a door, retractable window, trunk, and the like. The reinforced extrusion includes a reinforcement core comprising at least one operably flexible wire arrangement formed as a series of loops spaced apart and a plurality of threaded cords attached therewith, e.g., forming a snake skin or webbing like configuration. A thermoplastic overmold having a predetermined durometer and thickness is formed on at least one side of the reinforcement core, e.g., formed on one side while the reinforcement core is substantially flat. An extruded layer having a predetermined durometer and thickness is selectively formed around the thermoplastic overmold and reinforcement core. The thermoplastic overmold helps to prevent the reinforcement core pattern from showing through to an outside show surface of the extruded layer when installed on the motor vehicle. A channel portion that is semi-rigid for retaining a motor vehicle component edge or flange, e.g., a door frame flange is formed by operably bending or shaping the reinforcement core with thermoplastic overmold to a predetermined shape, e.g., forming a predetermined shape during an extrusion process. The extruded layer also has a flange portion that is at least partly flexible and operably shaped to extend generally from the channel portion and engage a motor vehicle component, e.g., a window pane, to help trim and/or seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of prior art extrusion trim having an elastomeric material extruded around a pre-formed metal core creating a hungry horse appearance;

FIG. 2 is a front view of a reinforced extrusion, according to the present invention;

FIG. 3 is a perspective view of the reinforced extrusion showing a reinforcement core in phantom, according to the present invention.

DETAILED DESCRIPTION OF THE PREFERRED EMBODIMENTS

Figure 4:
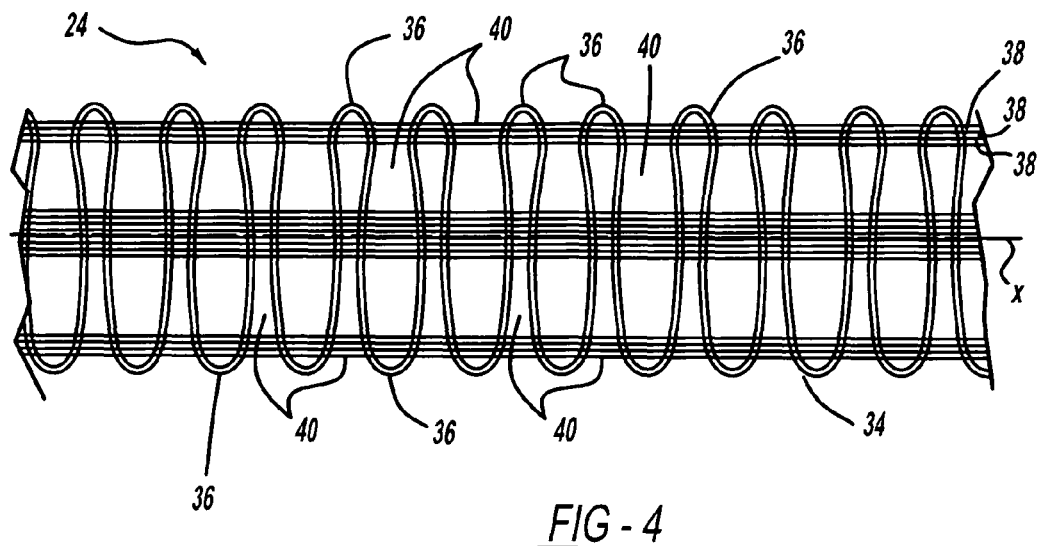
FIG. 4 is a top view of a reinforcement core, according to the present invention.

The following description of the preferred embodiment(s) is merely exemplary in nature and is in no way intended to limit the invention, its application, or uses.

Referring to FIG. 1, there is shown an example of a prior art extrusion trim 10 depicting an example of an undesirable rippled appearance or hungry horse effect on the visible show surfaces 11. The extrusion trim 10 has a pre-formed metal core 12 and an elastomeric material 14 extruded directly about the metal core 12. The indentations 16 or recesses giving a hungry horse appearance is caused by the elastomeric material 14 sinking into slots or apertures between metal members of the metal core 12 when the elastomeric material 14 is extruded about the metal core 12.

Referring to FIGS. 2-3, a reinforced extrusion of the present invention, generally shown at 18, includes a channel portion 20 that is semi-rigid, and a flange portion 22 that can be at least partly flexible and extends radially from the channel portion 20. The reinforced extrusion 18 has a reinforcement core, shown generally at 24, and a thermoplastic overmold 26 formed on at least one side of the reinforcement core 24. The thermoplastic overmold 26 can at least partly fill any gaps formed in the reinforcement core 24 to help reduce or eliminate any sinking of the extruded layer 28 material into the reinforcement core 24. The reinforcement core 24 and thermoplastic overmold 26 are operably shaped to create the channel portion 20, e.g., to form a U-shaped channel and the like.

An extruded layer 28 is selectively formed at least partly around the thermoplastic overmold 26 and reinforcement core 24 and has a flange portion 22 that is at least partly flexible and extends outward generally from the channel portion 20 to engage a motor vehicle component. The extruded layer 28 has an internal surface 30 operably configured to grip and retain a motor vehicle component edge or flange within the channel portion 20. The extruded layer 28 also has an exterior surface 32 that is at least partly visible as a show surface when the reinforced extrusion 18 is installed on a motor vehicle. The extruded layer 28 has a predetermined durometer and thickness and is formed of a second material that can be different from the first material of the thermoplastic overmold 26, e.g., rubber-like, softer plastics, lower durometer, anti-squeak, weather resistant, and the like, and combinations thereof, to prevent damage to a motor vehicle component and create a trim/seal. The thermoplastic overmold 26 helps to prevent or inhibit the reinforcement core 24 from showing through to any show surface of the extruded layer 28.

While a substantially U-shaped channel portion 20 with a U-shaped reinforcement core 24 and thermoplastic overmold 26 is illustrated, it is understood that it can alternatively be S-shaped, T-shaped, capital I-shaped and the like shapes operable to engage a motor vehicle component, e.g., metal edge or flange. It is further understood that the flange portion 22 can alternatively be S-shaped, substantially circular, and the like shapes operable to engage a motor vehicle component, e.g., a window pane.

Referring to FIGS. 2-4 generally, the reinforcement core 24 has at least one operably flexible wire 34 arranged to form a series of loops 36 and the like that are spaced apart along the longitudinal axis, x, of the reinforcement core 24. Each spaced apart loop 36 extends generally transverse to the longitudinal axis x and forms the width of the reinforcement core 24. A plurality of substantially straight threaded cords 38 and the like are coupled to each of the loops 36 to extend along the longitudinal axis x of said reinforcement core 24 for added stability of the reinforcement core 24 while still allowing the reinforcement core 24 to selectively flex or bend and the loops 36 to selectively compress and decompress. Generally, the flexible wire 34 is made of aluminum, galvanized steel, stainless steel, and the like. Typically, using the flexible wire 34 helps to reduce the amount of metal required to form the reinforcement core 24. By way of non-limiting example, the reinforcement core 24 can be product style number 70356 manufactured by Hope Global. The reinforcement core 24 can be substantially flat when the thermoplastic overmold 26 is formed on the reinforcement core 24 and is operably flexible to accommodate bending and shaping during forming of the channel portion 20 of the reinforced extrusion 18 and to accommodate curves and bends of a motor vehicle component edge when installing the reinforced extrusion 18.

Figure 5:
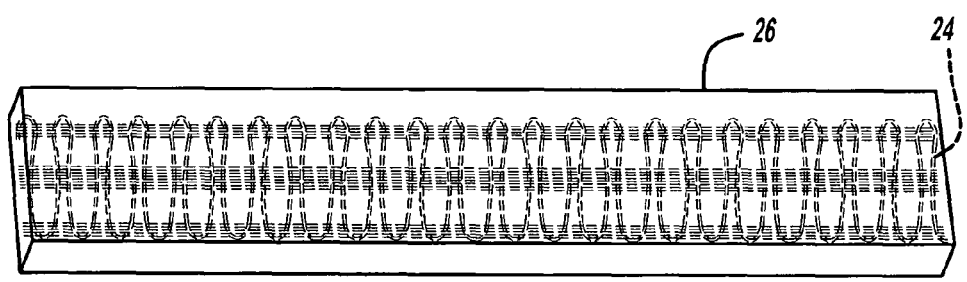
FIG. 5 is a perspective view of a thermoplastic overmold formed on the reinforcement core shown in phantom, according to the present invention.

FIG. 5 illustrates the reinforcement core 24 in phantom and the thermoplastic overmold 26 formed about the reinforcement core 24. The reinforcement core 24 can be substantially flat when the thermoplastic overmold 26 is formed on the reinforcement core 24. The reinforcement core 24 is coated by the thermoplastic to help prevent the reinforcement core 24 from showing through to any visible show, e.g., the exterior surface 32, of the reinforced extrusion 18 when installed in a motor vehicle. It is understood that the thickness and durometer of the thermoplastic overmold 26 is operable to help prevent a hungry horse appearance and to maintain structural integrity of the reinforced extrusion 18. It is further understood that the thermoplastic overmold 26 can be selectively applied on one side of the reinforcement core 24 and alternatively, one both sides. It is further understood that one side of the reinforcement core 24 can selectively have a thermoplastic overmold 26 having a first durometer and/or first thickness of a first material and an opposing side of the reinforcement core 24 having a second durometer and/or second thickness of a second overmold material.

Referring to FIGS. 4-7 generally, the thermoplastic overmold 26 is formed along at least one side of the reinforcement core 24 at a predetermined thickness. The thermoplastic overmold 26 coats the flexible wire 34 and threaded cords 38 of the reinforcement core 24 and at least partly fills any gaps, 40, shown in FIG. 4, between the loops 38 to help create a smoother reinforcement core surface. The appearance and visibility of the reinforcement core 24 showing through to a show surface of the reinforced extrusion 18 is thereby reduced. In addition, the thermoplastic overmold 26 helps to strengthen and stabilize the reinforcement core 24 and allows the channel portion 20 to operably flex to accommodate bending and manipulation in response to a vehicle component edge during installation and helps retention of the reinforced extrusion 18. Generally, the thermoplastic overmold 26 is a structural thermoplastic having an operable stiffening agent for strengthening the channel portion 20. Preferably, the thermoplastic overmold 26 is a thermoplastic having a predetermined thickness and durometer operable for reducing the visibility or read through of the reinforcement core 24 pattern and selectively allowing bending during forming of the reinforced extrusion 18 as well as following curves and bends of a motor vehicle component edge when installing and retaining the reinforced extrusion 18.

Figure 6:
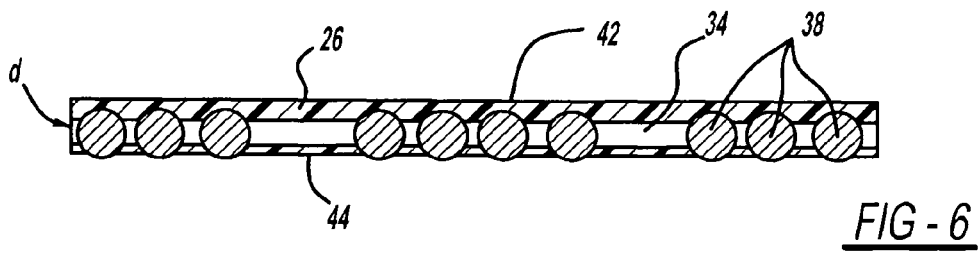
FIG. 6 is a side view of the reinforcement core and a thermoplastic overmold formed on the reinforcement core, according to the present invention.
Figure 7:
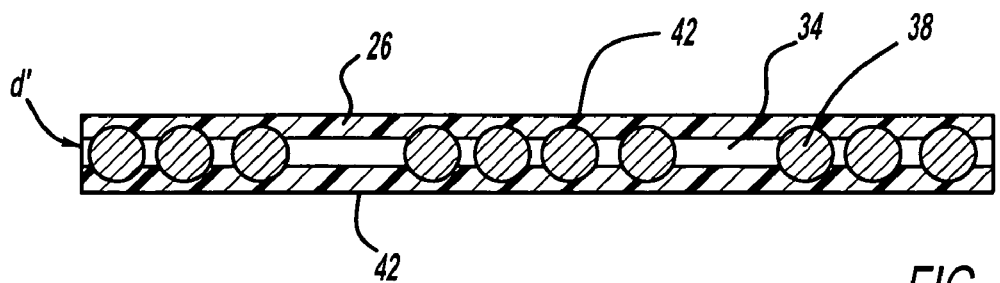
FIG. 7 is a side view of the reinforcement core and a thermoplastic overmold formed on the reinforcement core, according to another embodiment of the present invention.

FIGS. 6-7 illustrate side views of the reinforcement core 24 with thermoplastic overmolds 26 formed thereon. FIG. 6 illustrates an example of one side of the reinforcement core 24 having a thicker thermoplastic overmold 26 creating a first outer surface 42 that can be substantially smooth. A second side of the reinforcement core 24 has a thinner thermoplastic overmold 26 than the first and creates a second outer surface 44 that can be rougher, e.g., the threaded cords can partly protrude on the second outer surface 44. FIG. 7 illustrates an example of both sides of the reinforcement core 24 having the same thickness of thermoplastic overmold 26 formed thereon, such that both have a first outer surface 42 that is substantially smooth. Accordingly, the overall thickness, indicated as d, of the thermoplastic overmold 26 and reinforcement core 24 depicted in FIG. 6 is less or thinner than the overall thickness indicated as d', of the thermoplastic overmold 26 and reinforcement core 24 depicted in FIG. 7.

Referring to FIGS. 2-3, the interior surface 30 formed by the extruded layer 28 can further comprise retention members 46 for receiving and retaining opposing mounting features of a vehicle component edge or flange. The retention members 46 can comprise opposing offset and angled barbs, protrusions, and the like for engaging opposingly disposed features of the vehicle component flange.

Figure 8:
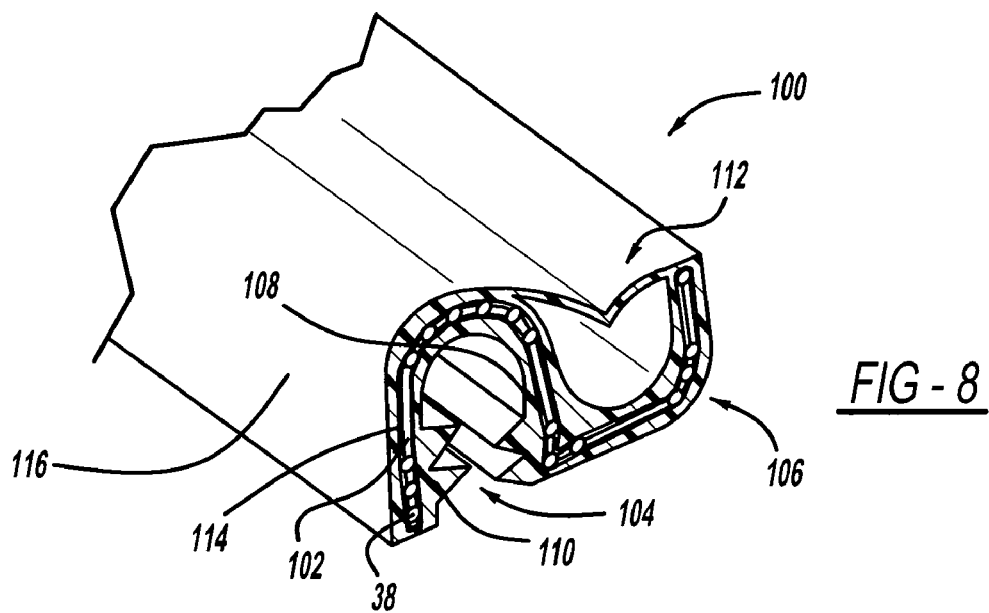
FIG. 8 is a perspective view of a reinforced extrusion, according to another embodiment of the present invention.

FIG. 8 illustrates another embodiment of the reinforced extrusion 100 of the present invention showing a reinforcement core 102 having a channel portion 104 configured to form an S-shape for selectively receiving and retaining at least one respective vehicle component edge or flange. At least one of the interior surfaces 108 of the S-shaped channel portion 104 has retention members 110 for engaging opposingly disposed barbs or protrusions of the vehicle component edge or flange. A second portion 106 forming part of the channel portion 104 can engage an additional vehicle component, e.g., a window. It is understood that one portion of the S-shaped channel portion, e.g., at least a web 112 of a second portion 106, can selectively engage a window pane and the like. The thermoplastic overmold 114 is formed on at least one side of the reinforcement core 102 and an extruded layer 116 is formed around the thermoplastic overmold 114. A web 112 or flange portion can be formed as a single piece with the extruded layer 116 and can be configured as a solid web extending at least over said second portion 106 opening of said channel portion 104.

Figure 9:
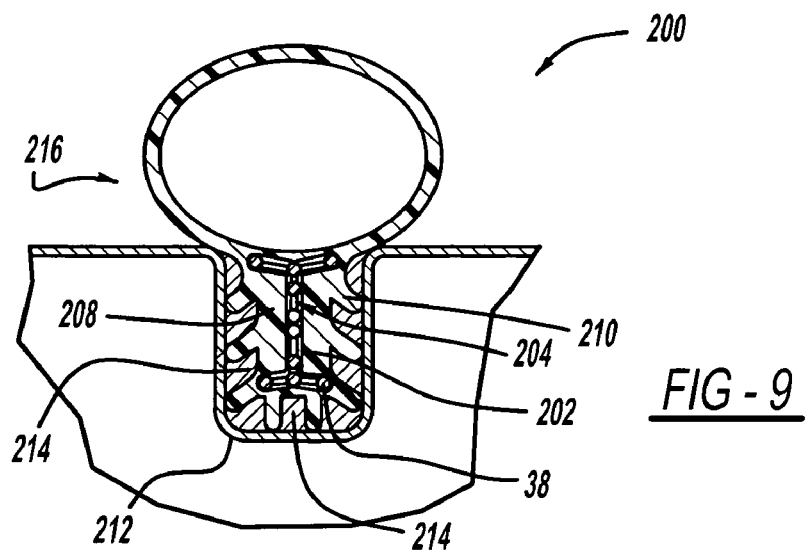
FIG. 9 is a front view of a reinforced extrusion, according to yet another embodiment of the present invention.

FIG. 9 illustrates yet another embodiment of the reinforced extrusion 200 of the present invention having no U-shaped channel portion. The thermoplastic overmold 202 is formed on at least one side of the reinforcement core 204, e.g., a capital I-shaped reinforcement core, and the extruded layer 206 selectively encapsulates the reinforcement core 204 and thermoplastic overmold 202 to form an exterior surface 208. The exterior surface 208 can have opposing retention members 210 on at least one side of the exterior surface 208. The reinforced extrusion 200 is at least partly inserted into a vehicle channel or structural recess 212 or aperture of the vehicle component and the retention members 210 engage opposingly disposed protrusions 214 of the vehicle component. The flange portion 216 is integrally formed as a single piece with the extruded layer 206 and can be a substantially circular or oblong shaped to operably engage a vehicle component, e.g., a window pain.

The method of making the reinforced extrusion 18,100,200 includes providing the reinforcement core 24 and forming a thermoplastic overmold 26 having an operable reinforcing or stiffening agent on at least one side of the reinforcement core 24, e.g., using vacuum-forming technology, injection molding, and the like. The reinforcement core 24 can be positioned such that it is substantially flat or planar for receiving the thermoplastic overmold 26. By way of non-limiting example, the reinforcement core 24 can be placed substantially flat or planar in a vacuum forming machine and at least one sheet of thermoplastic material having a stiffening agent placed in operable association with the reinforcement core 24 such that when the vacuum forming process is energized, the thermoplastic is heated and selectively forms on the respective side of the reinforcement core 24 and at least partly fills the gaps 40. The thermoplastic preferably infiltrates, at least partly and more preferably substantially, the gaps 40 and coats the flexible wire 34 and threaded cords 38 of the reinforcement core 24. It is understood that an alternative process may be used to operably form the thermoplastic overmold 26, e.g. injection molding a thermoplastic material that flows over at least one side of the reinforcement core 24.

The reinforcement core 24 with the thermoplastic overmold 26 is advanced through an extrusion machine die configured to shape the reinforced extrusion 18. An elastomeric material is extruded to selectively encapsulate the thermoplastic overmold 26 and reinforcement core 24 and to form the extruded flange 22. The extrusion machine die shapes at least the channel portion 20, e.g., forms a U-shape, S-shape, I-shape, and the extruded flange 22 extending from and integrally formed as one piece with the channel portion 20 thereby forming the reinforced extrusion 18 profile. By way of non-limiting example, the reinforced extrusion 18 profile comprises the channel portion 20 and the flexible extruded flange 22. It is understood that alternatively, a final forming die may be used to create a final reinforced extrusion 18 profile after the reinforced extrusion 18 has advanced through the extrusion machine, e.g., to form or define retention members 46 in the channel portion 20. It is further understood that an optional intermediate shape, e.g., U-shape, curved shape, and the like, may be formed after the thermoplastic overmold 26 is formed on the reinforcement core 24 and prior to the extrusion process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reinforced extrusion for a motor vehicle, comprising:
a channel portion that is semi-rigid,
a reinforcement core for forming at least said channel portion;
a thermoplastic overmold formed on both sides of said reinforcement core and said thermoplastic overmold formed on one side of said reinforcement core has a lower durometer than said thermoplastic overmold formed on a second side of said reinforcement core; and
an extruded layer formed to encapsulate said reinforcement core and thermoplastic overmold and forming a flange portion extending from said channel portion, wherein said thermoplastic overmold inhibits said reinforcement core from showing through to an exterior surface of said extruded layer when installed on a motor vehicle.

2. The reinforced extrusion according to claim 1, wherein said thermoplastic overmold is formed of a first material to coat said reinforcement core and at least partly fill gaps in said reinforcement core to inhibit said extruded layer from sinking into said gaps.

3. The reinforced extrusion according to claim 1, wherein said thermoplastic overmold formed on one side of said reinforcement core is thicker than said thermoplastic overmold formed on an opposing side of said reinforcement core, wherein said thicker thermoplastic overmold creates a first outer surface that is substantially smooth to inhibit said reinforcement core from showing through to said exterior surface of said extruded layer.

4. The reinforced extrusion according to claim 1, further comprising retention members formed on an interior surface of said channel portion for retaining opposing features on a motor vehicle component edge.

5. The reinforced extrusion according to claim 1, wherein said channel portion is substantially U-shaped.

6. The reinforced extrusion according to claim 1, wherein said channel portion is substantially S-shaped.

7. The reinforced extrusion according to claim 1, wherein said reinforcement core has at least one flexible wire arranged as a series of loops that are spaced apart along a longitudinal axis of said reinforcement core.

8. The reinforced extrusion according to claim 1, wherein said thermoplastic overmold is a thermoplastic operable to strengthen and stabilize said reinforcement core.

9. A reinforced extrusion for a motor vehicle, comprising:
a channel portion that is semi-rigid;
a reinforcement core having at least one flexible wire arranged as a series of loops that are spaced apart along a longitudinal axis of said reinforcement core and a plurality of threaded cords coupled to said loops;
a thermoplastic overmold of a first material formed on both sides of said reinforcement core to coat said flexible wire and at least partly fill gaps in said reinforcement core;
an extruded layer of a second material formed to encapsulate said reinforcement core and thermoplastic overmold and forming a flange portion extending from said channel portion to engage a motor vehicle component, wherein said thermoplastic overmold prevents said reinforcement core from showing through to an exterior surface of said extruded layer when installed on a motor vehicle; and wherein said thermoplastic overmold formed on one side of said reinforcement core is thinner than said thermoplastic overmold formed on a second side of said reinforcement core.

10. The reinforced extrusion according to claim 9, further comprising retention members formed on an interior surface of said channel portion for retaining opposing features on a motor vehicle component edge.

11. The reinforced extrusion according to claim 9, wherein said channel portion is substantially U-shaped.

12. The reinforced extrusion according to claim 9, wherein said channel portion is substantially S-shaped.

13. The reinforced extrusion according to claim 9, wherein said flange portion is substantially circular.

* * * * *